(12) United States Patent
Seto et al.

(10) Patent No.: US 7,242,420 B2
(45) Date of Patent: Jul. 10, 2007

(54) IMAGE FORMING DEVICE (75) Inventors: Masanori Seto, Iwatsuki (JP); Yoshiaki Haginoya, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 125 days.

(21) Appl. No.: 11/008,286

(22) Filed: Dec. 10, 2004

(65) Prior Publication Data
US 2005/0264645 A1  Dec. 1, 2005

(30) Foreign Application Priority Data
May 28, 2004 (JP) ............................. 2004-159216

(51) Int. Cl.
B41J 2/435 (2006.01)
(52) U.S. Cl. ..................... 347/263; 347/245
(58) Field of Classification Search ................ 347/242, 347/245, 257, 263; 399/110, 111
See application file for complete search history.

(56) References Cited

U.S. PATENT DOCUMENTS 5,231,458 A * 7/1993 Nishimura ................. 399/253
6,570,696 B2   5/2003 Ori
6,862,032 B2 * 3/2005 Haginoya et al. ........... 347/129
2004/0183884 A1 * 9/2004 Haginoya et al. ........... 347/129

FOREIGN PATENT DOCUMENTS

| JP | 8-2000 A | 1/1996 |
| JP | 08-006321 A | 12/1996 |
| JP | 2004-109335 A | 4/2004 |

* cited by examiner

Primary Examiner—Huan Tran
(74) Attorney, Agent, or Firm—Sughrue Mion. PLLC (57) ABSTRACT An image forming device equipped with a light scanning device having a polygon mirror that deflects laser light by rotating, a focusing element for focusing deflected laser light onto a photosensitive body, and a reflection mirror reflecting and guiding to the photosensitive body the laser light which passes through the focusing element, given that a distance L between an end surface of the focusing element and the reflection mirror is 8 mm$\leq$L$\leq$25 mm, and an angle $\Theta$ formed by incident light and reflected light of the reflection mirror is 25°$\leq\Theta\leq$45°, the focusing element, the reflection mirror, and the photosensitive body are disposed such that a relationship between L and $\Theta$ satisfies 8 mm $\leq$Ltan$\Theta\leq$12 mm is provided.

19 Claims, 6 Drawing Sheets

RELATED ART

FIG.6 RELATED ART

IMAGE FORMING DEVICE

CROSS-REFERENCE TO RELATED APPLICATION

This application claims priority under 35 USC 119 from Japanese Patent Application No. 2004-159216, the disclosure of which is incorporated by reference herein.

BACKGROUND OF THE INVENTION

1. Field of the Invention

The present invention relates to an image forming device such as a laser copier, a laser printer, or the like, which is provided with a light scanning device which scans and exposes laser light onto a photosensitive body.

2. Description of the Related Art

Figure 5:
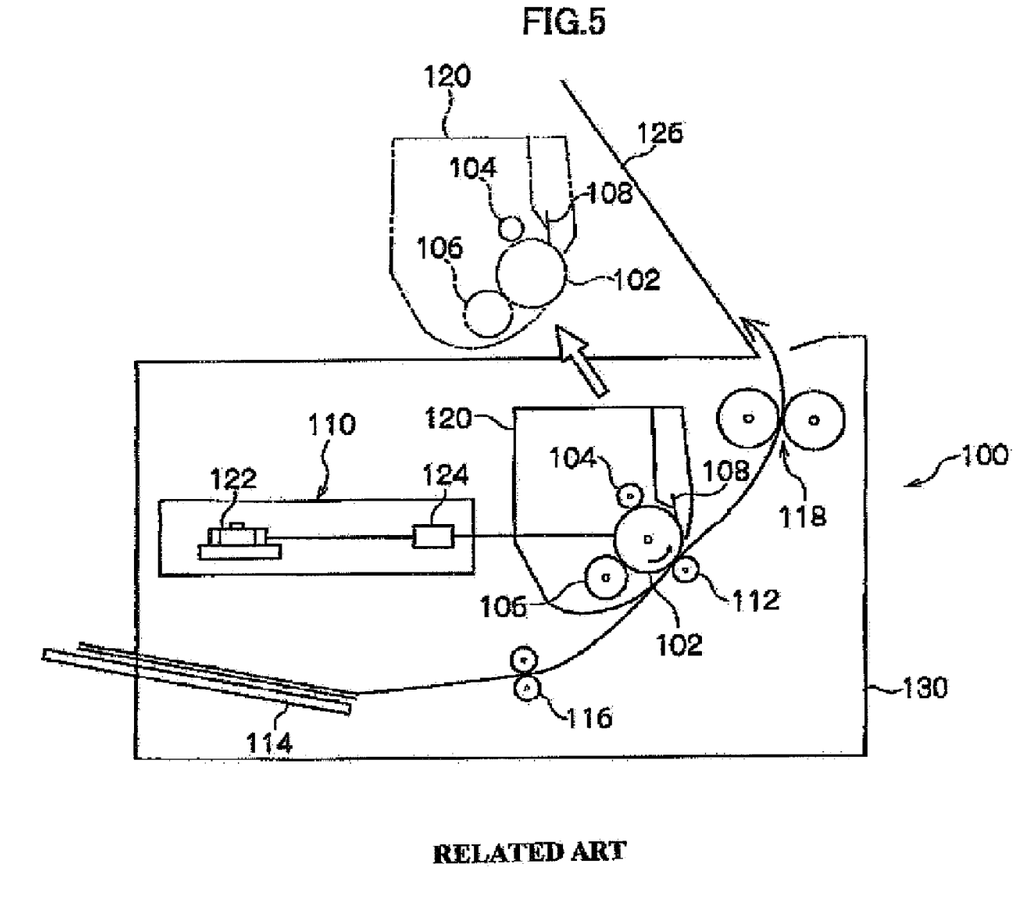
FIG. 5 is a schematic structural diagram showing an example of a conventional image forming device.

The structure shown in FIG. 5 is known as a conventional image forming device provided with a light scanning device which scans and exposes laser light onto a photosensitive body.

An image forming device 100 has a photosensitive drum 102. A charging roller 104, a developing roller 106, and a cleaning device 108 are disposed along the peripheral direction of the photosensitive drum 102. A light scanning device 110, which irradiates laser light onto the photosensitive drum 102, is provided between the charging roller 104 and the developing roller 106. A transfer roller 112 is disposed so as to face the photosensitive drum 102, at the side of the photosensitive drum 102 opposite the side where the light scanning device 110 is provided.

A polygon mirror 122, an fθ lens 124, and the like are disposed in the light scanning device 110. The laser light which passes through the fθ lens 124 is illuminated onto the photosensitive drum 102.

A sheet tray 114, which accommodates sheets and the like, is disposed beneath the light scanning device 110. A sheet which is fed-out from the sheet tray 114 is conveyed by conveying rollers 116 to the region where the photosensitive drum 102 and the transfer roller 112 face one another.

The photosensitive drum 102 is charged to a predetermined potential by the charging roller 104. The laser light illuminated from the light scanning device 110 is illuminated such that a latent image is formed. This latent image is developed by the developing roller 106 such that a toner image is formed. The toner image is transferred onto the sheet by the transfer roller 112, and the toner image on the sheet is fixed at a fixing device 118.

Such an image forming device 100 has an image forming unit 120 in which the photosensitive drum 102, the charging roller 104, the developing roller 106, and the cleaning device 108 are integral. By opening a cover 126 formed at the top portion of a housing 130, the image forming unit 120 can be installed and removed (see, for example, Japanese Patent Application Laid-Open (JP-A) No. 2004-109335).

However, in this image forming device 100, the sheet tray 114 is disposed beneath the light scanning device 110, and the laser light is illuminated rectilinearly from the light scanning device 110 onto the photosensitive drum 102. Therefore, there is the problem that the depth of the housing 130 (the dimension thereof in the transverse direction in FIG. 5) is large. Moreover, the image forming unit 120 is installed and removed by opening the cover 126. Therefore, there is the need to ensure space for opening the cover 126 above the housing 130, and the workability at the time of replacing the image forming unit 120 is poor.

Figure 6:
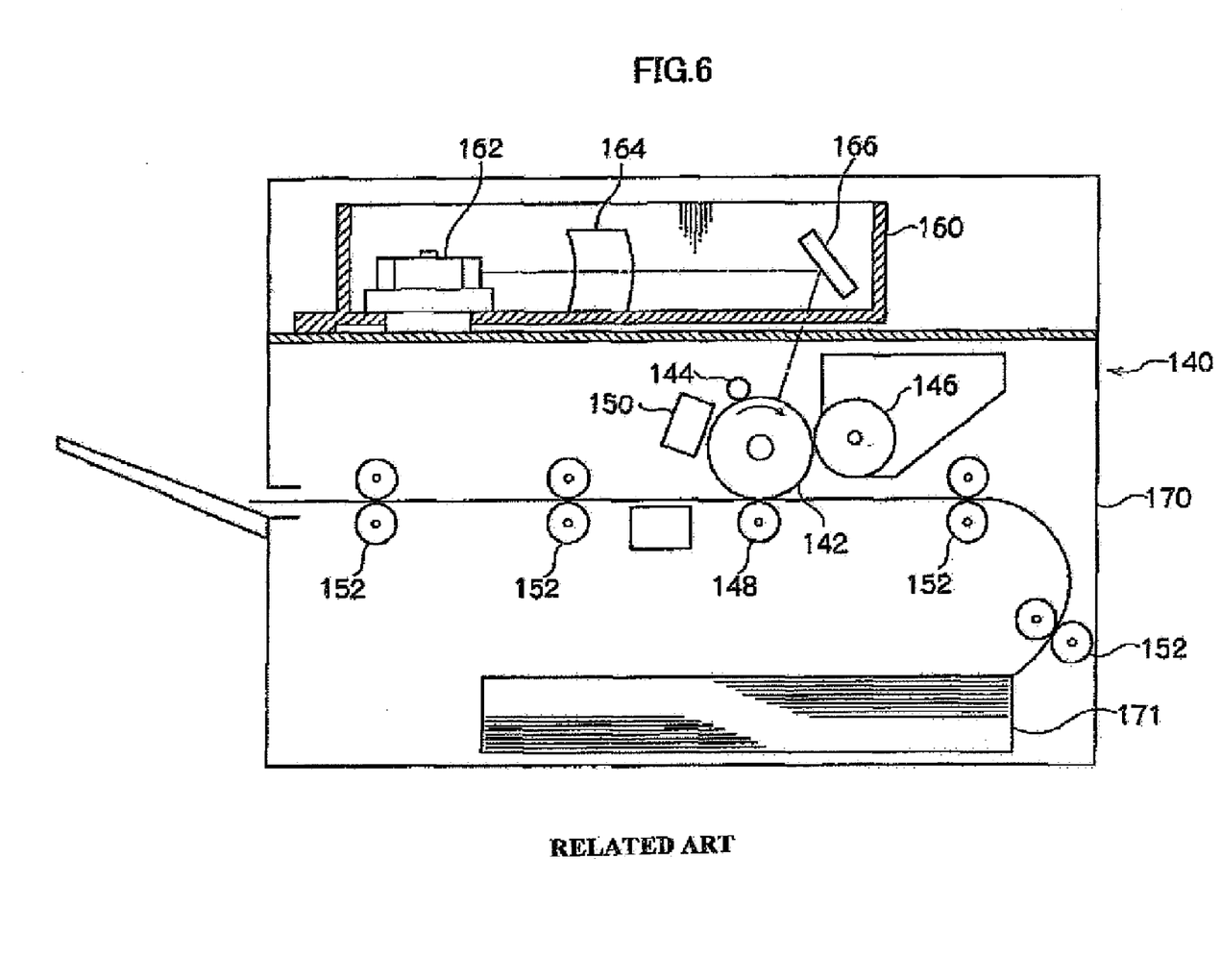
FIG. 6 is a schematic structural diagram showing another example of a conventional image forming device.

As a countermeasure to the large size of the image forming device 100, as shown in FIG. 6, there is proposed an image forming device 140 in which a reflection mirror 166 is provided at the light exiting side of a polygon mirror 162 and an fθ lens 164 in a light scanning device 160 (see, for example, JP-A No. 8-2000).

In the image forming device 140, a photosensitive drum 142 is charged to a predetermined potential by a charging roller 144. Laser light is illuminated from the light scanning device 160 such that a latent image is formed. The latent image is developed by a developing roller 146 such that a toner image is formed. The toner image is transferred by a transfer roller 148 onto a sheet which is being conveyed by conveying rollers 152. The surface of the photosensitive drum 142 after transfer is cleaned by a cleaning device 150.

In this image forming device 140, the laser light is reflected by the reflection mirror 166 and is illuminated onto the photosensitive drum 142. Therefore, as compared with the image forming device 100 shown in FIG. 5, the image forming device 140 has the feature that the depth (the transverse direction dimension in FIG. 6) of a housing 170 can be made smaller.

However, in the image forming device 140, the laser light turn-back angle of the reflection mirror 166 is 60° or more. The height of the housing 170 is large when the space for placement of the reflection mirror 166 and the photosensitive drum 142 is taken into consideration. Further, when a sheet tray 171 is disposed beneath the photosensitive drum 142, the height of the housing 170 becomes even larger. Moreover, when the photosensitive drum 142, the charging roller 144, the developing roller 146, and the cleaning device 150 are made integral and structure an image forming unit (see FIG. 5), it is difficult to make the image forming device 140 compact when the direction of installing and removing this image forming unit is taken into consideration.

SUMMARY OF THE INVENTION

The present invention has been developed in view of the aforementioned, and the present invention provides an image forming device which realizes conservation of space in the depthwise direction and the heightwise direction of a housing of the device.

A first aspect of the present invention is an image forming device equipped with a light scanning device having a polygon mirror which deflects laser light by rotating, a focusing element for focusing deflected laser light onto a photosensitive body, and a reflection mirror reflecting and guiding to the photosensitive body the laser light which passes through the focusing element, wherein, given that a distance L between an end surface of the focusing element and the reflection mirror is 8 mm$\leq$L$\leq$25 mm, and an angle $\Theta$ formed by incident light and reflected light of the reflection mirror is 25°$\leq\Theta\leq$45°, the focusing element, the reflection mirror, and the photosensitive body are disposed such that a relationship between L and $\Theta$ satisfies 8 mm$\leq$Ltan$\Theta\leq$12 mm.

In the image forming device of the first aspect of the present invention, given that the height of an image forming section (a portion of the image forming device other than an optional cassette) required in order to make the image forming device compact is 230 mm and the thickness of the light scanning device is 25 mm to 30 mm, the distance L between the end surface of the focusing element and the reflection mirror and the turn-back angle $\Theta$ of the laser light by the reflection mirror are set as described above. In this way, the thickness of the light scanning device can be kept to a minimum while the optical path length of the light scanning device is maintained. Further, by restricting L, the depth of the light scanning device can be kept to a given range. By restricting Θ (i.e., by making Θ an acute angle), the height of the image forming device main body can be kept to a given range.

By disposing the reflection mirror at the side near to the focusing element, the width (longitudinal direction dimension) and the height of the reflection mirror can be made to be small, and the cost of the reflection mirror can be kept low. Further, by disposing the reflection mirror at the side near the focusing element, the laser light irradiating window can be made to be small, and the rigidity of the light scanning device can be prevented from decreasing. Moreover, when the reflection mirror is far from the photosensitive body, non-uniform scanning caused by vibrations of the motor may often occur. However, by setting the angle Θ to be 45° or less, the effect of non-uniform scanning at the time when the motor vibrates can be made to be small.

A second aspect of the present invention is an image forming device equipped with a light scanning device having a polygon mirror which deflects laser light by rotating, a focusing element for focusing deflected laser light onto a photosensitive body, and a reflection mirror reflecting and guiding to the photosensitive body the laser light which passes through the focusing element, wherein, given that a distance L between an end surface of the focusing element and the reflection mirror is 8 mm≦L≦25 mm, and an angle Θ formed by incident light and reflected light of the reflection mirror is 25°≦Θ≦45°, the focusing element, the reflection mirror, and the photosensitive body are disposed such that a relationship between L and Θ and a height h (mm) from a floor portion of the focusing element to an optical axis satisfies 1≦Ltan Θ/(h+4)≦1.5.

In the image forming device of the second aspect of the present invention, the number 4 in "(h+4)" is a value set due to the light width margin of the light scanning device being 1.5 mm, and because there is the need to ensure a plate thickness of the housing of 2.5 mm or more from the standpoint of strength of the light scanning device. In this structure, given that the height of an image forming section (a portion of the image forming device other than an optional cassette) required in order to make the image forming device compact is 230 mm and the thickness of the light scanning device is 25 mm to 30 mm, the needed thickness of the focusing element can be easily computed.

A third aspect of the present invention is an image forming device equipped with a light scanning device having a polygon mirror which deflects laser light by rotating, a focusing element for focusing deflected laser light onto a photosensitive body, and a reflection mirror reflecting and guiding to the photosensitive body the laser light which passes through the focusing element, wherein, given that a distance L between an end surface of the focusing element and the reflection mirror is 8 mm≦L≦25 mm, and an angle Θ formed by incident light and reflected light of the reflection mirror is 25°≦Θ≦45°, the focusing element, the reflection mirror, and the photosensitive body are disposed such that a relationship between L and Θ and a thickness t (mm) of the focusing element satisfies 1≦LtanΘ/t≦1.5.

In the image forming device of the third aspect of the present invention, given that the height of an image forming section (a portion of the image forming device other than an optional cassette) required in order to make the image forming device compact is 230 mm and the thickness of the light scanning device is 25 mm to 30 mm, the thickness of the focusing element can be computed without taking into consideration the light width margin and the plate thickness of the housing.

A fourth aspect of the present invention is an image forming device including: a light scanning device having a polygon mirror that deflects laser light by rotating, a focusing element for focusing deflected laser light onto a photosensitive body, and a reflection mirror reflecting and guiding to the photosensitive body the laser light which passes through the focusing element; and an image forming unit, that forms a toner image on a surface of the photosensitive body and can be installed in and removed from the image forming device, wherein the light scanning device is provided at an upper portion of an image forming device main body, the image forming unit is installed in and removed from the image forming device through a front side of the image forming device main body, and is installed beneath the light scanning device, a sheet to which the toner image is transferred is conveyed toward a rear side of the image forming device main body, and an angle formed by incident light and reflected light which is guided to the photosensitive body, of the reflection mirror is an acute angle.

Because the image forming device relating to the present invention is structured as described above, conservation of space of the light scanning device is made possible, and by accommodating the light scanning device in a small space in the image forming device main body, the image forming device can be made compact in the depthwise and heightwise directions.

BRIEF DESCRIPTION OF THE DRAWINGS

Embodiments of the invention will be described in detail with reference to the following figures, wherein.

DETAILED DESCRIPTION OF THE INVENTION

Hereinafter, an embodiment of an image forming device relating to the present invention will be described on the basis of the drawings.

First, the overall structure of the image forming device and a summary of the printing operation will be described, and then the main portions of the present invention will be explained.

Figure 1:
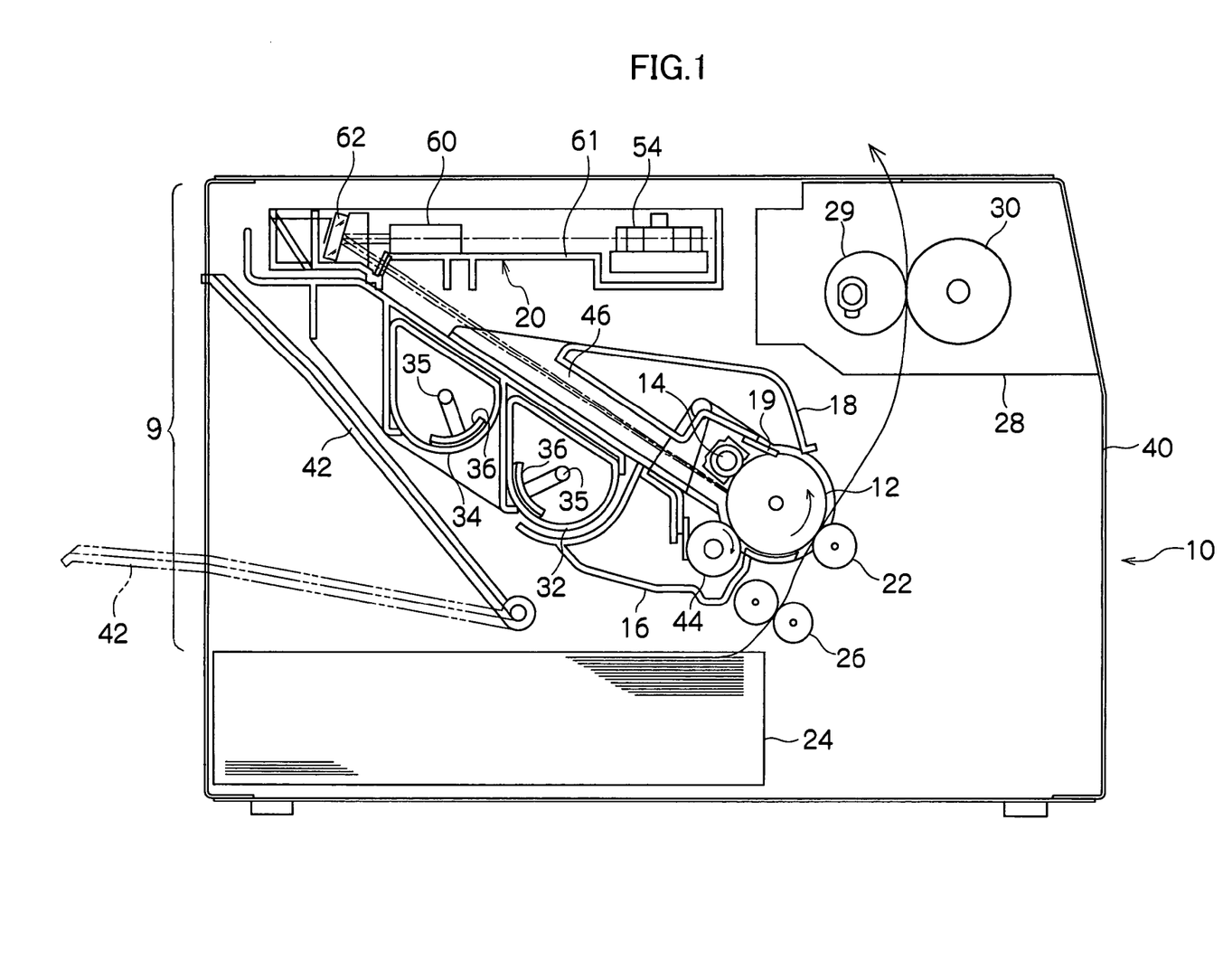
FIG. 1 is a schematic structural diagram showing an image forming device relating to an embodiment of the present invention.

As shown in FIG. 1, an image forming device 10 has a photosensitive drum 12 on whose surface a latent image is formed. A charging roller 14, a developing device 16, and a cleaning device 18 are disposed along the peripheral direction of the photosensitive drum 12. A light scanning device 20, which irradiates laser light from diagonally above the photosensitive drum 12 through a portion between the charging roller 14 and the developing device 16, is provided. A transfer roller 22 is disposed so as to face the photosensitive drum 12 at the side of the photosensitive drum 12 opposite the side where light from the light scanning device 20 is irradiated.

A sheet tray 24, which accommodates sheets or the like in a stacked manner, is disposed beneath the developing device 16. The recording sheets, which are fed-out one-by-one by an unillustrated sheet feed roller from the sheet tray 24, are conveyed by conveying rollers 26 to the region where the photosensitive drum 12 and the transfer roller 22 face one another. A fixing device 28, which has a heating roller 29 and a pressure-applying roller 30 pressed against the heating roller 29, is disposed at the sheet conveying direction downstream side of the transfer roller 22.

Two developer stirring chambers 32, 34 are disposed at the side of the developing device 16 opposite the side at which the photosensitive drum 12 is located. By augers 36 which rotate around supporting shafts 35, the developer is stirred and conveyed. The developer which is mixed in the developer stirring chamber 32 is conveyed into the developing device 16.

Figure 2:
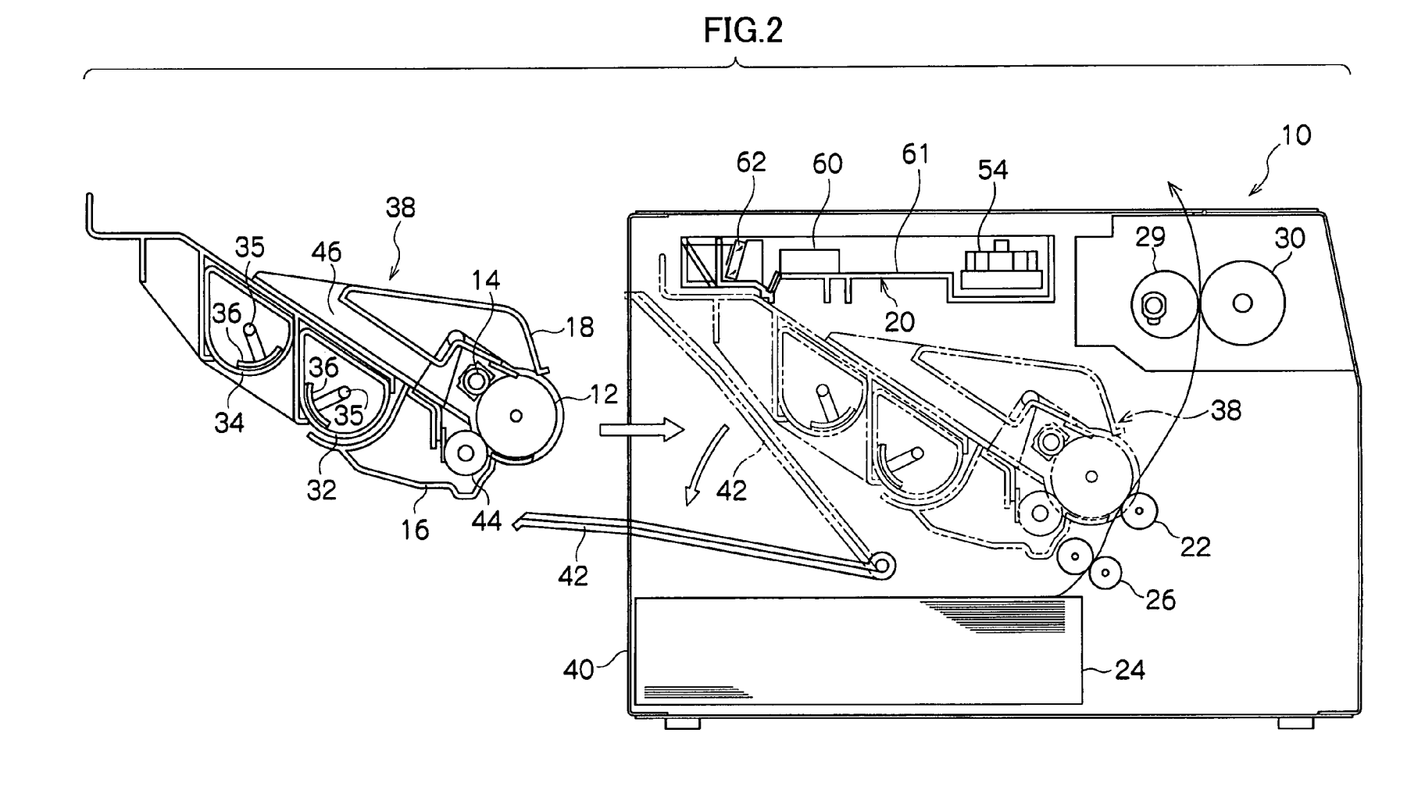
FIG. 2 is a schematic structural diagram showing the image forming device relating to the embodiment of the present invention, and shows a structure for installing and removing an image forming unit.

As shown in FIG. 2, the photosensitive drum 12, the charging roller 14, the developing device 16, the developer stirring chambers 32, 34, and the cleaning device 18 are structured as an integral image forming unit 38. A cover 42 is provided at the front side of a housing 40. By opening the cover 42 downward (in the direction of the arrow), the image forming unit 38 can be installed in and removed from the housing 40. Namely, in the image forming device 10, the installing and removing the image forming unit 38 is carried out through the front side of the housing 40 (the left side of the device 10 in FIG. 2), and the conveying position of the sheets to the transfer roller 22 is set at the rear side of the housing 40 (the right side of the device 10 in FIG. 2).

In the image forming device 10, due to the photosensitive drum 12 rotating in the direction of the arrow, the photosensitive drum 12 is charged to a predetermined potential by the charging roller 14. Laser light is illuminated from the light scanning device 20, and a latent image is formed on the surface of the photosensitive drum 12. The toner is transferred from a developing roller 44 disposed within the developing device 16 such that the latent image is developed, and a toner image is formed on the surface of the photosensitive drum 12.

The sheet fed from the sheet tray 24 is conveyed by the conveying rollers 26 to between photosensitive drum 12 and the transfer roller 22, and the toner image on the photosensitive drum 12 is transferred onto the sheet by the transfer roller 22. The sheet is conveyed to the nip between the heating roller 29 and the pressure-applying roller 30, such that the toner image is heated and fused and is fixed on the sheet. The surface of the photosensitive drum 12 after the toner image has been transferred is cleaned by a blade 19 within the cleaning device 18, such that the toner remaining after the transfer is removed therefrom.

Figure 3:
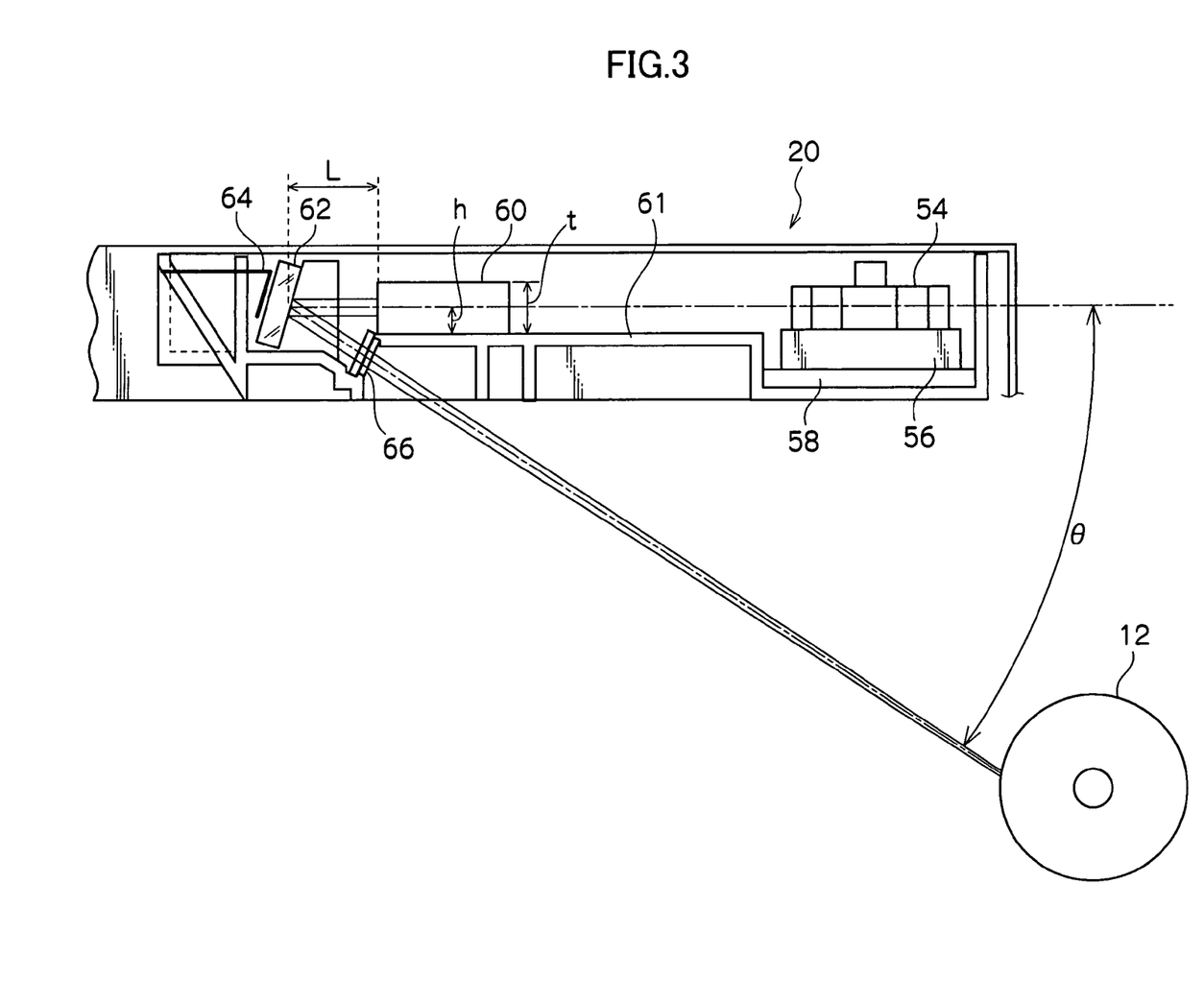
FIG. 3 is a sectional view showing a light scanning device used in the image forming device relating to the embodiment of the present invention.
Figure 4:
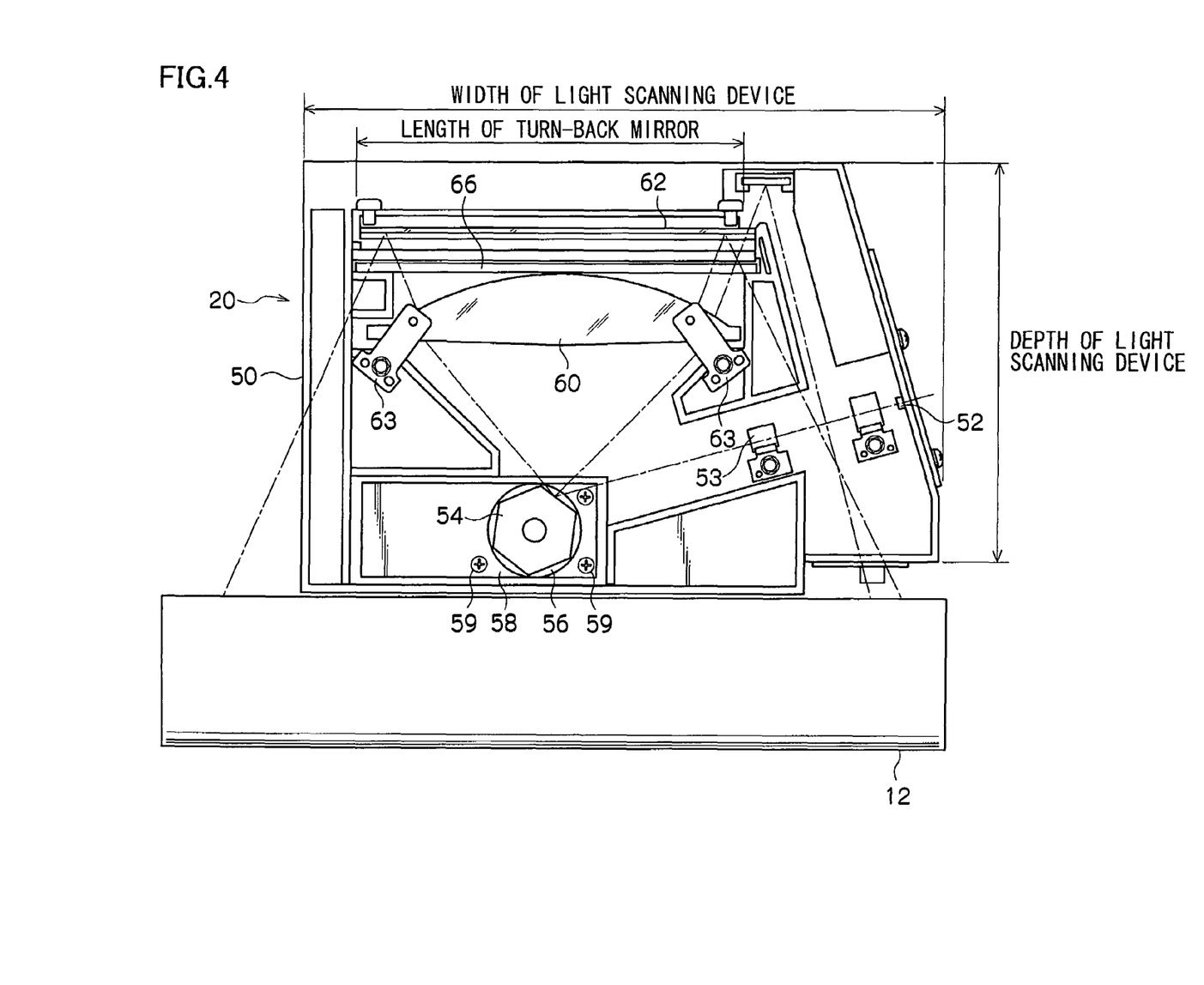
FIG. 4 is a structural diagram showing the light scanning device used in the image forming device relating to the embodiment of the present invention.

As shown in FIGS. 3 and 4, a light-emitting element 52, which has a laser diode which emits laser light, is disposed within a housing 50 of the light scanning device 20. A cylindrical lens 53, which collects the laser light in a linear form, is provided at the downstream side in the travelling direction of the laser light emitted from the light-emitting element 52. A polygon mirror 54, which is shaped as a regular hexagon and deflects the laser light, is disposed at the downstream side in the travelling direction of the laser light. A motor 56, which drives and rotates the polygon mirror 54, is disposed beneath the polygon mirror 54. A motor base plate 58 of the motor 56 is fixed to the housing 50 by screws 59.

An fθ lens (focusing element) 60, which is for focusing on the photosensitive drum 12 the laser light deflected by the polygon mirror 54, is disposed within the housing 50. The central portion, at the downstream side in the travelling direction of the laser light, of the fθ lens 60 is a protruding curved surface. The fθ lens 60 is disposed on a mounting plate 61, and the both end portions of the fθ lens 60 are supported by supporting members 63. A reflection mirror 62, which is for reflecting the laser light and guiding it to the photosensitive drum 12, is provided at the downstream side of the fθ lens 60. The reflection mirror 62 is held at a predetermined angle by a plate spring 64. A light exiting window 66, through which the laser light passes, is formed in the lower portion of the housing 50 at the downstream side of the reflection mirror 62.

In this light scanning device, the optical path length to the photosensitive drum 12 is determined by the reflection mirror 62 and the fθ lens 60 which focuses on the photosensitive drum 12 the laser light deflected by the polygon mirror 54. Further, an opening 46, which ensures the optical path along which the laser light from the light exiting window 66 is irradiated onto the photosensitive drum 12, is formed in the image forming unit 38.

In the light scanning device 20, a distance L between the end surface of the fθ lens 60 (the protruding curved surface of the central portion) and the reflection mirror 62 is set to be 14 mm, and an angle Θ formed by the incident light and the reflected light of the reflection mirror 62 is set to be 33°. Moreover, a thickness t of the fθ lens 60 is set to be 8 mm. A height h from the floor portion of the fθ lens 60 to the optical axis is 4 mm, and the optical axis is set so as to pass through the central portion of the fθ lens 60.

As shown in FIG. 4, the depth of the housing 50 of the light scanning device 20 is 240 mm, and the length of the reflection mirror 62 is set to be 123.5 mm.

Next, operation of the image forming device 10 of the present invention will be described.

In the image forming device 10, the laser light exiting from the light-emitting element 52 in the light scanning device 20 is collected in a linear form at the cylindrical lens 53, and is deflected by the polygon mirror 54 which is driven to rotate. Then, the laser light passes through the fθ lens 60, and is reflected by the reflection mirror 62. The reflected laser light travels from the light exiting window 66 through the opening 46, and is illuminated onto the photosensitive drum 12. At this time, main scanning is carried out at the photosensitive drum 12 by the rotation of the polygon mirror 54, and subscanning is carried out by the photosensitive drum 12 rotating in the peripheral direction (the direction of the arrow).

In this image forming device 10, the values of the distance L between the end surface of the fθ lens 60 and the reflection mirror 62, the angle Θ formed by the incident light and the reflected light of the reflection mirror 62, and the thickness t of the fθ lens 60 are set on the basis of the value of Ltan Θ when the values of L and θ are changed, as shown in Table 1.

TABLE 1

| | θ | | | | | | | |
|---|---|---|---|---|---|---|---|---|
| | 10 | 15 | 20 | 25 | 30 | 33 | 40 | 45 |
| | Ltan θ | | | | | | | |
| 8 | 1.41 | 2.14 | 2.91 | 3.73 | 4.62 | 5.20 | 6.71 | 8.00 |
| 10 | 1.76 | 2.68 | 3.64 | 4.66 | 5.77 | 6.49 | 8.39 | 10.00 |
| 12 | 2.12 | 3.22 | 4.37 | 5.60 | 6.93 | 7.79 | 10.07 | 12.00 |
| 14 | 2.47 | 3.75 | 5.10 | 6.53 | 8.08 | 9.09 | 11.75 | 14.00 |
| 16 | 2.82 | 4.29 | 5.82 | 7.46 | 9.24 | 10.39 | 13.43 | 16.00 |
| 18 | 3.17 | 4.82 | 6.55 | 8.39 | 10.39 | 11.69 | 15.10 | 18.00 |
| 20 | 3.53 | 5.36 | 7.28 | 9.33 | 11.55 | 12.99 | 16.78 | 20.00 |
| 25 | 4.41 | 6.70 | 9.10 | 11.66 | 14.43 | 16.24 | 20.98 | 25.00 |
| 30 | 5.29 | 8.04 | 10.92 | 13.99 | 17.43 | 19.48 | 25.17 | 30.00 |
| 35 | 6.17 | 9.38 | 12.74 | 16.32 | 20.21 | 22.73 | 29.37 | 35.00 |
| 40 | 7.05 | 10.72 | 14.56 | 18.65 | 23.09 | 25.98 | 33.56 | 40.00 |
| 45 | 7.93 | 12.06 | 16.38 | 20.98 | 25.98 | 29.22 | 37.76 | 45.00 |
| 50 | 8.82 | 13.40 | 18.20 | 23.32 | 28.87 | 32.47 | 41.95 | 50.00 |
| 60 | 10.58 | 16.08 | 21.84 | 27.98 | 34.64 | 38.96 | 50.35 | 60.00 |
| 70 | 12.34 | 18.76 | 25.48 | 32.64 | 40.41 | 45.46 | 58.74 | 70.00 |
| 90 | 15.87 | 24.12 | 32.76 | 41.97 | 51.96 | 58.45 | 75.52 | 90.00 |

L: distance from fθ lens to reflection mirror
θ: angle formed by incidence and reflection of reflection mirror Given that the height of an image forming section 9, required in order to make the image forming device 10 compact, is 230 mm and the thickness of the light scanning device 20 is 25 mm to 30 mm, by setting the values such that the relational expression $$8 \text{ mm} \leq L\tan\Theta \leq 12 \text{ mm}$$

is satisfied, the thickness of the light scanning device 20 can be kept to a minimum while the optical path length of the light scanning device 20 is maintained. Further, in order to make the light scanning device 20 and the image forming device 10 compact, it is preferable to set the values such that 8 mm≤L≤25 mm, and 25°≤Θ≤45°. The range of the distance L is set in accordance with the margin of the laser beam illuminating window of the light scanning device 20, and the limitations on the depth of the light scanning device 20. The range of the angle Θ is set by using the angle at which the laser light can be turned-back as the lower limit, and the limitation on the thickness of the light scanning device 20 as the upper limit.

On the basis of the above relational expression, satisfying $$1 \leq L\tan\Theta/(h+4) \leq 1.5$$

is effective in making the image forming device 10 compact in the depthwise and heightwise directions. The number 4 in this relational expression is set due to the light width margin of the light scanning device 20 being 1.5 mm, and the plate thickness of the mounting plate 61 which is needed, from the standpoint of strength, being 2.5 mm or more. Further, when expressed in terms of the thickness t of the fθ lens 60, satisfying $$1 \leq L\tan\Theta/t \leq 1.5$$

is effective in making the image forming device 10 compact in the depthwise and heightwise directions.

It is preferable that the thickness t of the fθ lens 60 is in the range of 6 mm≤t≤10 mm. This range of the thickness t is set by using a value, which ensures an effective range which is not affected by the molding strain of the fθ lens 60, as the lower limit, and the thickness limitation of the light scanning device 20 as the upper limit.

In the present embodiment, LtanΘ=9.09 mm, and the thickness of the light scanning device 20 can be made to be small. Further, because the value of the distance L is small, the depth of the light scanning device 20 can be made to be small. Moreover, because the turnback angle Θ is an acute angle, the height of the image forming device 10 can be made to be small.

Further, LtanΘ/(h+4)=1.136, and LtanΘ/t=1.136, and the range of the above relational expression is satisfied.

As described above, in the image forming device 10 of the present embodiment, the thickness of the light scanning device 20 can be made to be small, and space can be conserved in the depthwise and heightwise directions of the image forming device 10 while the optical path length of the laser light is ensured. Namely, the reflection mirror 62 is disposed immediately after the fθ lens 60, and the turn-back angle of the laser light by the reflection mirror 62 can be made to be an acute angle, and the depth and the thickness of the light scanning device 20 can be made to be small. Therefore, the light scanning device 20 can be placed within the limited space of the upper portion of the interior of the image forming device 10, and the image forming device 10 can be made compact. Further, by disposing the reflection mirror 62 immediately after the fθ lens 60, the length of the reflection mirror 62 can be made to be short, the width thereof also can be made to be small, and the cost thereof can be reduced. Moreover, when the reflection mirror 62 is set far from the photosensitive drum 12, non-uniform of scanning due to vibrations may often occurs. However, because the turnback angle of the laser light is an acute angle, as compared with a case in which it is an obtuse angle, fluctuations on the photosensitive drum 12 are small, and there is little banding at the time when the motor 56 vibrates. Moreover, by placing the reflection mirror 62 immediately after the fθ lens 60, the light exiting window 66 can be made to be small, and it is possible to prevent the rigidity of the light scanning device 20 from decreasing.

In the present embodiment, the fθ lens 60 is formed such that the central portion thereof is a protruding curved surface. However, the fθ lens 60 is not limited to such a configuration, and the present invention can be applied to lenses of other configurations. For the distance L between the end surface of the fθ lens and the reflection mirror, it suffices to measure the distance between the reflection mirror and the end surface of the fθ lens which end surface projects the furthest toward the reflection mirror. Moreover, the focusing element is not limited to only the fθ lens as in the present embodiment, and the present invention can be similarly applied to a case in which two or more lenses are utilized.

In the present embodiment, the optical axis of the fθ lens 60 is set so as to pass through the central portion (t=2 h). However, the present invention is not limited to such a structure, and can also be applied to cases in which the optical axis passes through the upper portion or the lower portion of the fθ lens.

Further, in the image forming devices of the first through third aspects of the present invention, the value of the thickness t of the focusing element is in a range of 6 mm ≤t≤10 mm.

The critical range of the thickness t is set such that a value ensuring an effective range which is not affected by the molding strain of the focusing element is the lower limit, and the thickness limitation of the light scanning device is the upper limit. In accordance with this image forming device, the thickness of the light scanning device can be kept small by keeping the thickness t of the focusing element to a minimum.

Further, in the image forming devices of the first through third aspects of the present invention, an image forming unit, that forms a toner image on a surface of the photosensitive body and can be installed in and removed from the image forming device, is provided, and the image forming unit is installed in and removed from the image forming device through a front side of an image forming device main body, and a sheet to which the toner image is transferred is conveyed toward a rear side of the image forming device main body.

While the space for installing and removing the image forming unit from the front side is ensured, the light scanning device can be accommodated in a small space in the upper portion of the image forming device main body, and the image forming device can be made compact.

Further, in the image forming devices of the first through third aspects of the present invention, the distance L is a distance between the end surface of the focusing element which end surface projects the furthest toward the reflection mirror and an end surface of the reflection mirror which end surface faces the end surface of the focusing element.

Further, in the image forming devices of the first through fourth aspects of the present invention, the focusing element is fθ lens.

What is claimed is:

1. An image forming device equipped with a light scanning device having a polygon mirror that deflects laser light by rotating, a focusing element for focusing deflected laser light onto a photosensitive body, and a reflection mirror reflecting and guiding to the photosensitive body the laser light which passes through the focusing element,
wherein, given that a distance L between an end surface of the focusing element and the reflection mirror is 8 mm$\leq$L$\leq$25 mm, and an angle $\Theta$ formed by incident light and reflected light of the reflection mirror is 25°$\leq\Theta\leq$45°, the focusing element, the reflection mirror, and the photosensitive body are disposed such that a relationship between L and $\Theta$ satisfies 8 mm$\leq$Ltan$\Theta\leq$12 mm.

2. The image forming device of claim 1, wherein a value of a thickness t of the focusing element is in a range of 6 mm$\leq$t$\leq$10 mm.

3. The image forming device of claim 1, wherein an image forming unit, that forms a toner image on a surface of the photosensitive body and can be installed in and removed from the image forming device, is provided, and
the image forming unit is installed in and removed from the image forming device through a front side of an image forming device main body, and a sheet to which the toner image is transferred is conveyed at a rear side of the image forming device main body.

4. The image forming device of claim 1, wherein the distance L is a distance between the end surface of the focusing element which end surface projects the furthest toward the reflection mirror and an end surface of the reflection mirror which end surface faces the end surface of the focusing element.

5. An image forming device equipped with a light scanning device having a polygon mirror that deflects laser light by rotating, a focusing element for focusing deflected laser light onto a photosensitive body, and a reflection mirror reflecting and guiding to the photosensitive body the laser light which passes through the focusing element,
wherein, given that a distance L between an end surface of the focusing element and the reflection mirror is 8 mm$\leq$L$\leq$25 mm, and an angle $\Theta$ formed by incident light and reflected light of the reflection mirror is 25°$\leq\Theta\leq$45°, the focusing element, the reflection mirror, and the photosensitive body are disposed such that a relationship between L and $\Theta$ and a height h mm from a floor portion of the focusing element to an optical axis satisfies 1$\leq$Ltan$\Theta$/(h+4)$\leq$1.5.

6. The image forming device of claim 5, wherein a value of a thickness t of the focusing element is in a range of 6 mm$\leq$t$\leq$10 mm.

7. The image forming device of claim 5, wherein an image forming unit, that forms a toner image on a surface of the photosensitive body and can be installed in and removed from the image forming device, is provided, and
the image forming unit is installed in and removed from the image forming device through a front side of an image forming device main body, and a sheet to which the toner image is transferred is conveyed at a rear side of the image forming device main body.

8. The image forming device of claim 5, wherein the distance L is a distance between the end surface of the focusing element which end surface projects the furthest toward the reflection mirror and an end surface of the reflection mirror which end surface faces the end surface of the focusing element.

9. An image forming device equipped with a light scanning device having a polygon mirror that deflects laser light by rotating, a focusing element for focusing deflected laser light onto a photosensitive body, and a reflection mirror reflecting and guiding to the photosensitive body the laser light which passes through the focusing element,
wherein, given that a distance L between an end surface of the focusing element and the reflection mirror is 8 mm$\leq$L$\leq$25 mm, and an angle $\Theta$ formed by incident light and reflected light of the reflection mirror is 25°$\leq\Theta\leq$45°, the focusing element, the reflection mirror, and the photosensitive body are disposed such that a relationship between L and $\Theta$ and a thickness t mm of the focusing element satisfies 1$\leq$Ltan$\Theta$/t $\leq$1.5.

10. The image forming device of claim 9, wherein a value of a thickness t of the focusing element is in a range of 6 mm$\leq$t$\leq$10 mm.

11. The image forming device of claim 9, wherein an image forming unit, that forms a toner image on a surface of the photosensitive body and can be installed in and removed from the image forming device, is provided, and
the image forming unit is installed in and removed from the image forming device through a front side of an image forming device main body, and a sheet to which the toner image is transferred is conveyed at a rear side of the image forming device main body.

12. The image forming device of claim 9, wherein the distance L is a distance between the end surface of the focusing element which end surface projects the furthest toward the reflection mirror and an end surface of the reflection mirror which end surface faces the end surface of the focusing element.

13. An image forming device comprising:
a light scanning device having a polygon mirror that deflects laser light by rotating, a focusing element for focusing deflected laser light onto a photosensitive body, and a reflection mirror reflecting and guiding to the photosensitive body the laser light which passes through the focusing element; and
an image forming unit, that forms a toner image on a surface of the photosensitive body and can be installed in and removed from the image forming device, wherein
the light scanning device is provided at an upper portion of an image forming device main body,
the image forming unit is installed in and removed from the image forming device through a front side of the image forming device main body, and is installed beneath the light scanning device,
a sheet to which the toner image is transferred is conveyed at a rear side of the image forming device main body, and
an angle Θ formed by incident light generated by the polygon mirror and prior to being reflected by the reflection mirror, and reflected light which is guided to the photosensitive body of the reflection mirror, is $25° \leq \Theta \leq 45°$.

14. The image forming device of claim 13, wherein the focusing element is fθ lens.

15. The image forming device of claim 13, further comprising a cover provided at said front side of said image forming device main body, wherein said image forming unit is installed in and removed from said image forming device by opening said cover.

16. The image forming device of claim 13, wherein said incident light is diagonally irradiated from said reflection mirror to said image forming unit.

17. The image forming device of claim 13, wherein said image forming unit comprises an integral structure having a photosensitive drum, a charging roller, and a developing device.

18. The image forming device of claim 17, said integral structure image of said image forming unit further comprising at least one developer stirring chamber and a cleaning device.

19. The image forming device of claim 13 further comprising a transfer roller that transfers the toner image from the photosensitive body to the sheet, the transfer roller being positioned at the rear side of the image forming device main body.

* * * * *